United States Patent
Bing et al.

(10) Patent No.: US 12,455,626 B2
(45) Date of Patent: Oct. 28, 2025

(54) TOUCH PAD

(71) Applicant: Peratech IP Ltd., North Yorkshire (GB)

(72) Inventors: Lv Bing, Jiangsu (CN); Zhang Heng, Jiansu (CN); Zhang Chuanyang, Jiansu (CN); Xu Feng, Jiansu (CN); You Dawei, Jiansu (CN); Cao Jin, Jiansu (CN)

(73) Assignee: Peratech IP Ltd., North Yorkshire (GB)

( * ) Notice: Subject to any disclaimer, the term of this patent is extended or adjusted under 35 U.S.C. 154(b) by 0 days.

(21) Appl. No.: 17/784,691

(22) PCT Filed: Dec. 11, 2020

(86) PCT No.: PCT/GB2020/000099
§ 371 (c)(1),
(2) Date: Jun. 13, 2022

(87) PCT Pub. No.: WO2021/116642
PCT Pub. Date: Jun. 17, 2021

(65) Prior Publication Data
US 2023/0350493 A1    Nov. 2, 2023

(30) Foreign Application Priority Data
Dec. 13, 2019 (CN) .......................... 201922257647.3

(51) Int. Cl.
*G06F 3/01* (2006.01)
*G06F 3/0354* (2013.01)
*G06F 3/041* (2006.01)
*G06F 3/044* (2006.01)

(52) U.S. Cl.
CPC .......... *G06F 3/016* (2013.01); *G06F 3/03547* (2013.01); *G06F 3/0414* (2013.01); *G06F 3/0443* (2019.05); *G06F 2203/04105* (2013.01)

(58) Field of Classification Search
USPC .......................... 715/701, 702; 345/173, 174
See application file for complete search history.

(56) References Cited

U.S. PATENT DOCUMENTS

| 4,852,443 A * | 8/1989 | Duncan .................. G10H 3/146 84/DIG. 12 |
| 2004/0075676 A1* | 4/2004 | Rosenberg ............ A63F 13/245 715/701 |
| 2006/0109256 A1* | 5/2006 | Grant ...................... G06F 3/041 345/173 |

(Continued)

OTHER PUBLICATIONS

Corresponding International Patent Application No. PCT/GB2020/000099, International Search Report dated Mar. 16, 2021.

*Primary Examiner* — Christopher J Fibbi
(74) *Attorney, Agent, or Firm* — Cooper Legal Group LLC (57) ABSTRACT

A touch pad, comprises a housing comprising a vibration device, a cover, a capacitive sensing layer electrically connected to a processor and a pressure sensing layer arranged in the housing, also electrically connected to the processor. The capacitive sensing layer is positioned between the cover and the pressure sensing layer. The processor is configured to utilize a signal output from either the capacitive sensing layer or the pressure sensing layer to activate the vibration device.

14 Claims, 7 Drawing Sheets

(56) References Cited

U.S. PATENT DOCUMENTS

| | | | |
|---|---|---|---|
| 2007/0052691 A1* | 3/2007 | Zadesky | G06F 3/0362 |
| | | | 345/173 |
| 2011/0141052 A1* | 6/2011 | Bernstein | G06F 3/041 |
| | | | 341/5 |
| 2014/0253500 A1* | 9/2014 | Curtis | G06F 3/04166 |
| | | | 345/174 |
| 2015/0234446 A1* | 8/2015 | Nathan | G06F 3/0445 |
| | | | 345/174 |
| 2017/0293377 A1* | 10/2017 | Hsu | G06F 3/0412 |
| 2018/0164940 A1* | 6/2018 | Li | G06F 3/04142 |
| 2018/0181200 A1 | 6/2018 | Ollen | |
| 2020/0301531 A1* | 9/2020 | Kring | G06F 1/16 |

* cited by examiner

TOUCH PAD

CROSS REFERENCE TO RELATED APPLICATIONS

This application claims priority from Chinese Utility Model number ZL 2019 2 2257647.3, filed on 13 Dec. 2019, the whole contents of which are incorporated herein by reference.

BACKGROUND OF THE INVENTION

The present invention relates to a touch pad, a keyboard comprising a touch pad and a method of activating a touch pad.

Electronic devices comprising touch products have become increasingly widespread in popularity and market.

Existing touch pads or track pads incorporate capacitive sensors comprising a plurality of conductive electrodes, which, in response to the touch or press from a user's finger, a change in capacitance is generated across the conductive electrodes. This change in capacitance is processed by means of a processor to produce an output, such as the position of the finger touch or press.

In known prior art systems, electronic devices sometimes use a processor to drive a vibration device to vibrate when a change in capacitance is registered by the processor, thereby allowing the user to receive tactile feedback from the electronic device and enhance the user experience.

However, this feedback and vibration only occurs when a capacitance change is registered meaning the capacitive sensor must be activated to produce the change in capacitance. When an electronic device is in sleep mode, for example, the capacitive sensor is generally in a low current state, meaning a touch does not always produce the most suitable response. This can be frustrating to a user and can result in an inconsistent or unpredictable response.

BRIEF SUMMARY OF THE INVENTION

According to a first aspect of the present invention, there is provided a touch pad.

According to a second aspect of the present invention, there is provided a method of activating a touch pad.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
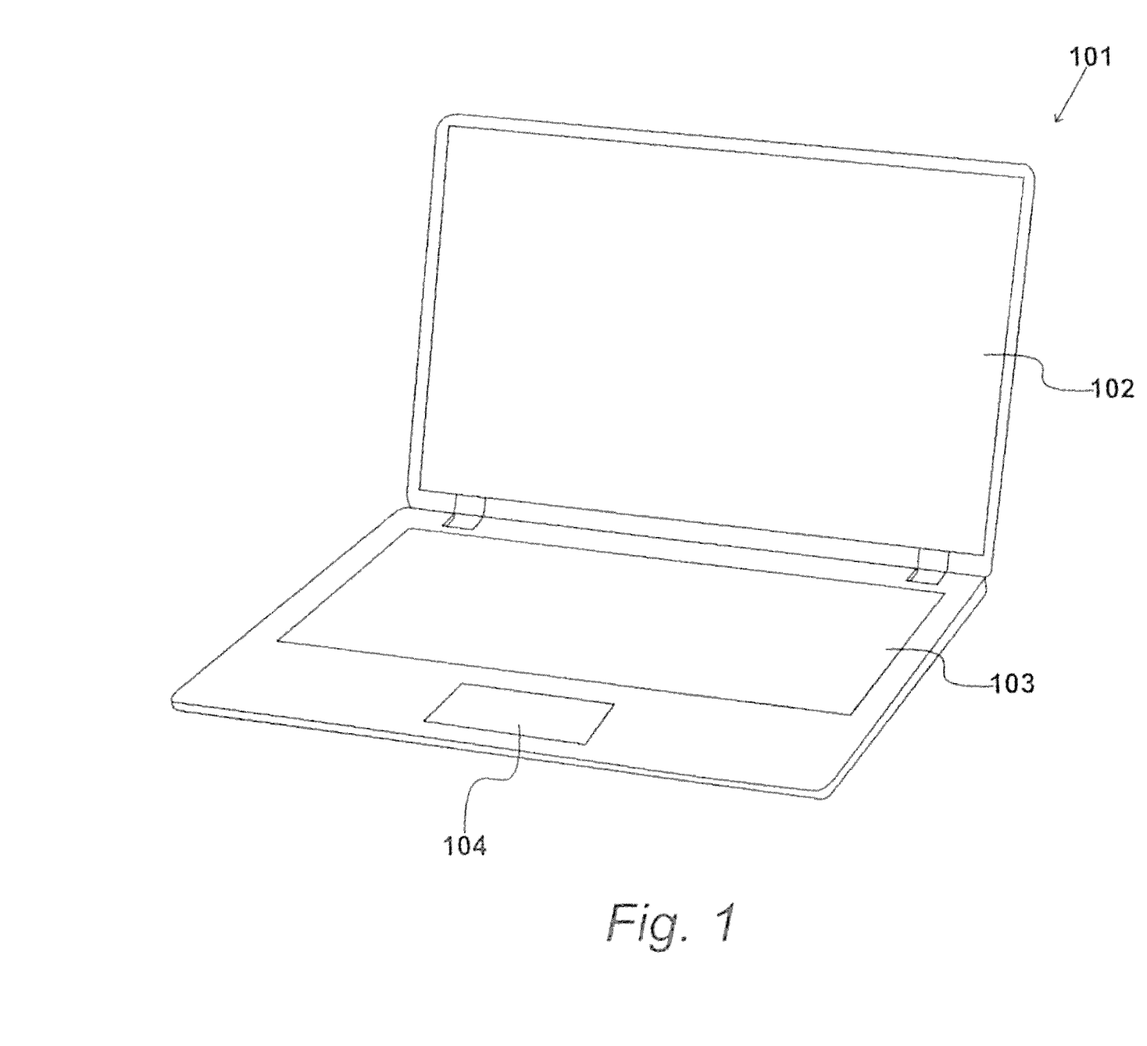
FIG. 1 shows an electronic device comprising a keyboard having a touch pad.

FIG. 1

Electronic device 101 comprises display 102 and keyboard 103 comprising touch pad 104.

In the embodiment, keyboard 103 is applied to electronic device 101, which, in this embodiment, is a notebook computer. It is appreciated that in alternative embodiments, alternative electronic devices can be utilized that may require a touch pad in a similar manner.

In conventional systems, touch pad 104 is utilized to provide an input which may be output onto display 102. In this way, on activation of touch pad 104, touch pad 104 may be utilized to provide movement of, for example, a cursor across display 102 to allow a user to interface with electronic device 101.

The present application provides an alternative to known touch pads used in this manner and provides an improved system for a user, particularly in situations where the display 102 an electronic device 101 may be in a sleep mode configuration where touch pad 104 is traditionally inactivated.

Figure 2:
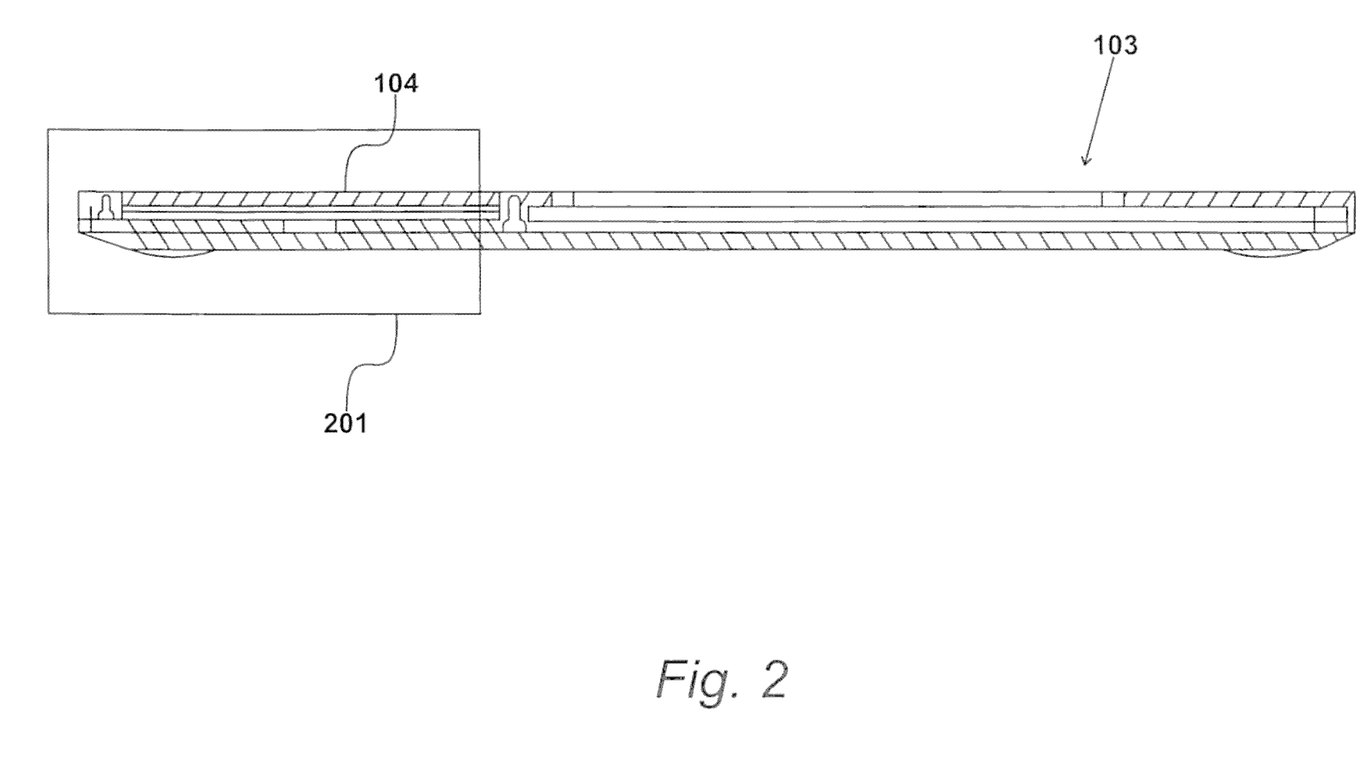
FIG. 2 shows a schematic cross-sectional side view of the keyboard of FIG. 1.

FIG. 2

A side view of keyboard 103 in cross-sectional form is shown in isolation in FIG. 2. As previously indicated keyboard 103 comprises touch pad 104. Touch pad 104 is currently the most widely used computer mouse for notebook computers. Touch pad 104 provides an input device that is configured to move a cursor on display 102 on a substantially smooth touch pad 104 by sliding a finger across its top surface.

Conventional touch pads track the movement of an applied finger by means of capacitive sensing. This process is not sensitive to finger heat, has a sensitive response, responds quickly, and is relatively stable during use.

However, conventional touch pads are limited only by this process and the present invention provides an improved touch pad 104 that provides improved human interaction.

A portion 201 of keyboard 103 incorporating touch pad 104 will now be described in FIG. 3.

Figure 3:
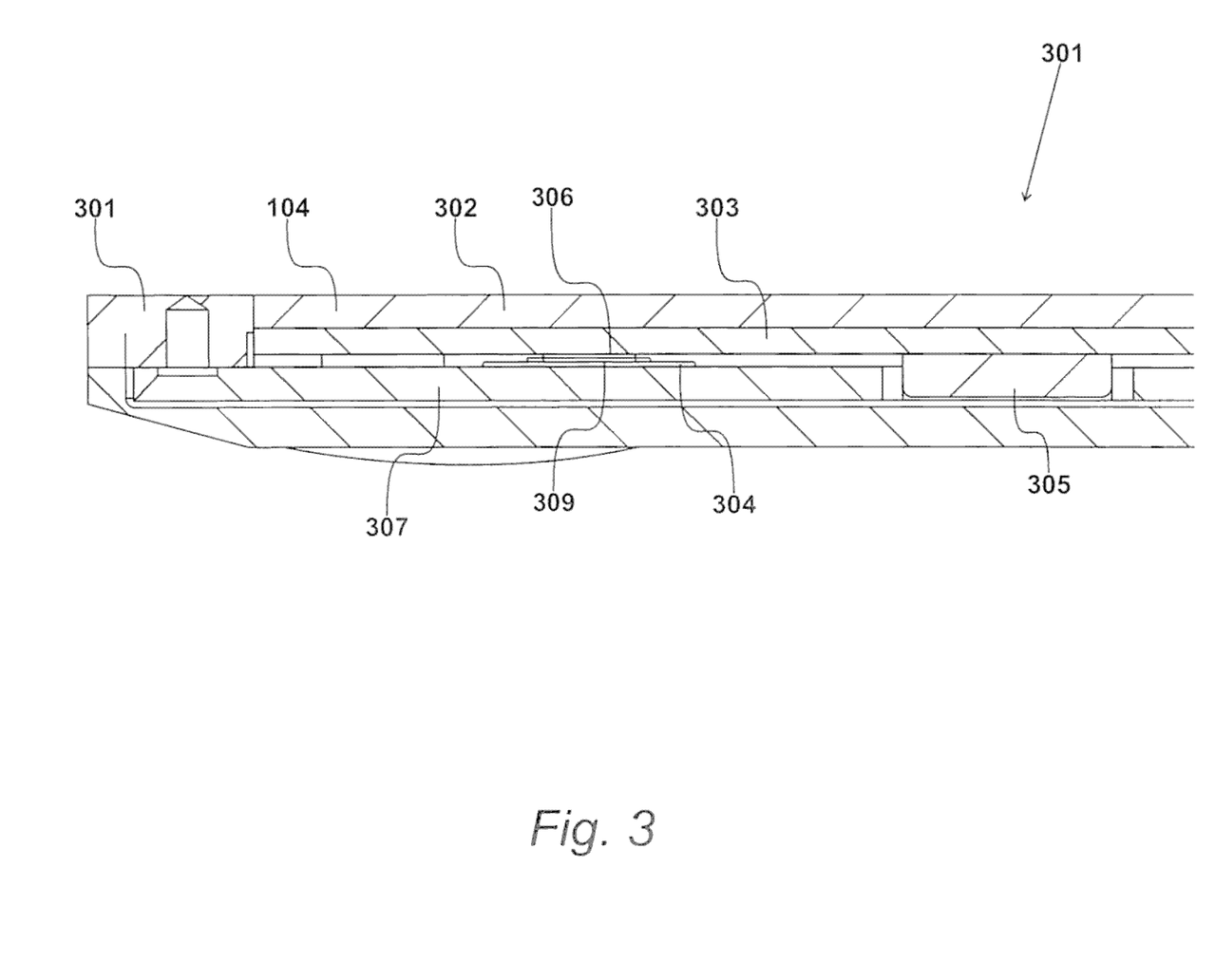
FIG. 3 shows a portion of the keyboard of FIG. 1 illustrating a cross-sectional schematic view of a touch pad.

FIG. 3

Portion 201 of keyboard 103 is shown in isolation in FIG. 3. Portion 201 illustrates touch pad 104 which comprises a housing 301, a cover 302, a capacitive sensing layer 303, and a pressure sensing layer 304 arranged in housing 301. In the embodiment, cover 302, capacitive sensing layer 303 and pressure sensing layer 304 are arranged in order from the top of touch pad 104 to the bottom of touch pad 104. Thus, capacitive sensing layer 303 is positioned between cover 302 and pressure sensing layer 304.

Touch pad 104 further comprises a vibration device 305 provided in housing 301.

Capacitive sensing layer 303 is configured to sense the position of an applied pressure from a user's finger by means of the capacitance from the human body. That is, when a user's finger touches cover 302, capacitance is generated across the surface of capacitive sensing layer 303.

To enable this, a sensing matrix is attached to the surface of the capacitive sensing layer 303. This sensing matrix is configured to continuously track the trajectory of a user's finger capacitance to enable a continuous location of finger movement as the user traces their finger across cover 302. This process will be described in further detail in FIGS. 4 to 7.

When a user's finger is applied it may be moved at any position on the surface of cover 302 when performing operations. Therefore, capacitive sensing layer 303 is configured to be substantially similar in size and dimension to cover 302. In this way, cover 302 and capacitive sensing layer 303 have a substantially similar cross-sectional area.

Pressure sensing layer 304 is configured to receive a pressure transmitted by cover 302. Thus, in contrast, the cross-sectional area of pressure sensing layer 304 can be smaller than the cross-sectional area of cover 302. Thus, the size and dimensions of pressure sensing layer 304 may be any suitable size or cross-sectional area depending on the specific needs of a given application.

In the embodiment, touch pad 104 further comprises an actuator 306 provided between capacitive sensing layer 303 and pressure sensing layer 304. Actuator 306 is configured to transfer an applied pressure through capacitive sensing layer 303 to pressure sensing layer 304. Thus, actuator 306 provides an amplification of the pressure applied such that pressure sensing layer 304 receives an indication of the pressure applied.

In the embodiment, the cross-sectional area of actuator 306 is relatively small. Under the same pressure, the pressure on actuator 306 is relatively large. Thus, through the transformation effect on actuator 306, pressure sensing layer 304 is more sensitive to pressure. This is beneficial in that it improves the sensitivity of vibration feedback of vibration device 305.

In the embodiment, touch pad 104 further comprises a support plate 307 disposed the housing 301. Pressure sensing layer 304 is disposed on support plate 307. Support plate 307 provides a stable support for pressure sensing layer 304 to ensure that pressure sensing layer 304 is able to receive pressure readings.

As shown, cover 302, capacitive sensing layer 303, and pressure sensing layer 304 are arranged in housing 301. Pressure sensing layer 304 is positioned on an upper surface 308 of support plate 307. In the embodiment, support plate 307 comprises a metallic material and, in one embodiment, comprises a metal plate.

In the embodiment, a spacer 309 is arranged between support plate 307 and pressure sensing layer 304. Spacer 309 provides additional stability to pressure sensing layer 304 in use.

Support plate 307 further functions to discharge static electricity generated during the operation of the touch pad 104 while also serving as a stable support to provide stable use of the touch pad 104.

In the embodiment, cover plate 302 comprises a metal material. This allows touch pad 104 to be textured while also improving the overall strength of cover 302. This further provides the advantage of improving discharge of static electricity.

In the embodiment, vibration device 305 is disposed to one side of capacitive sensing layer 303 and away from cover 302. In addition, an insulating layer may be provided between vibration device 305 and capacitive sensing layer 303 to ensure stability of capacitive sensing layer 303 in use. This also ensures that vibration feedback of the vibration device 305 is easier to transmit to cover 302, thereby improving user experience.

Figure 4:
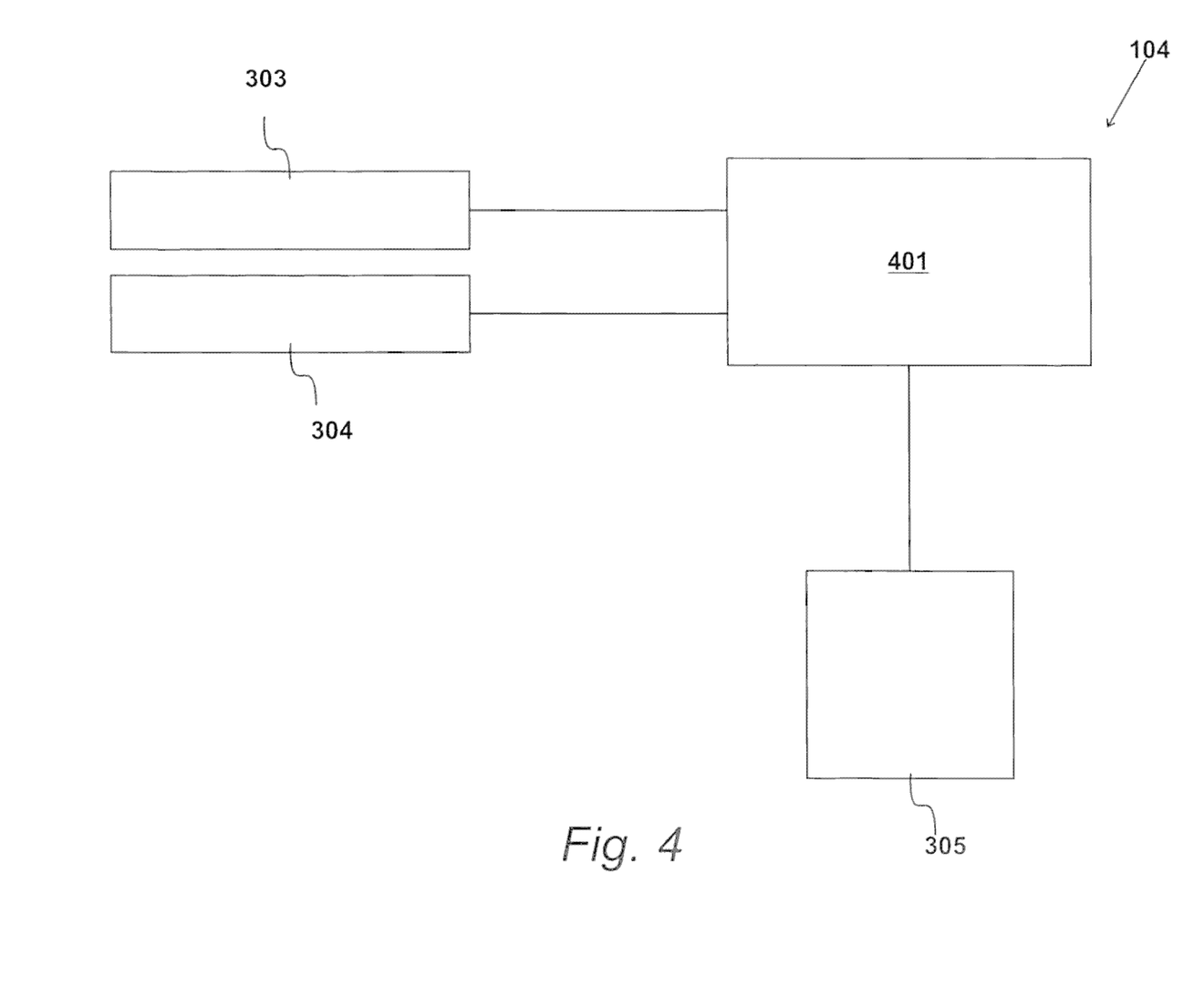
FIG. 4 shows a schematic diagram of a touch pad in accordance with the invention.

FIG. 4

A schematic diagram of touch pad 104 is shown in FIG. 4. Touch pad 104 further comprises a processor 401 which is electrically connected to capacitive sensing layer 303 and pressure sensing layer 304. Processor 401 is further electrically connected to vibration device 305.

Thus, as vibration device 305, capacitive sensing layer 303 and pressure sensing layer 304 are respectively connected to processor 401 by means of an electrical connection, processor 401 is able to control vibration device 305 to vibrate according to a voltage signal of the capacitance sensing layer 303 or a pressure signal of pressure sensing layer 304.

Thus, when capacitance is generated on the surface of capacitive sensing layer 303, when processor 401 receives a voltage signal from capacitive sensing layer 303, processor 401 synchronously controls the vibration of the vibration device 305, such that a user receives a tactile response of vibration when cover 302 is touched.

In an example embodiment, whereby display 102 is off and electronic device 101 is functioning in a sleep mode, the voltage signal from capacitive sensing layer 303 cannot be processed and transformed by processor 401 until electronic device 101 has been reactivated. To overcome this, the pressure signal from pressure sensing layer 304 is transmitted to processor 401, which provides an activation of vibration device 305 to ensure that a user can receive a substantially similar tactile response and vibration feedback through cover 302.

Provided processor 401 receives a signal from either capacitance sensing layer 303 or pressure sensing layer 304, it controls the vibration of the vibration device 305, which gives a consistent response to a user.

In the embodiment, vibration device 305 is a linear motor. The linear motor converts electrical energy into mechanical energy and drives a spring mass to move linearly, thereby generating vibration. The linear motor has a long vibration stroke, a fast-starting speed, a controllable vibration direction, and a relatively compact structure, which enables touch pad 104 to be produced at a reduced thickness, making the overall structure more compact and reliable. This embodiment is therefore preferable to use of rotating motors comprising a rotor, which rely on electromagnetic induction to drive the rotor to rotate and generate vibration.

In the embodiment, pressure sensing layer 304 comprises a thin film pressure sensor. This type of pressure sensor comprises three parts including a pressure sensing element, a conversion circuit, and an electrical connector. The method of operation of the pressure sensing layer 304 will now be described with respect to FIG. 5.

Figure 5:
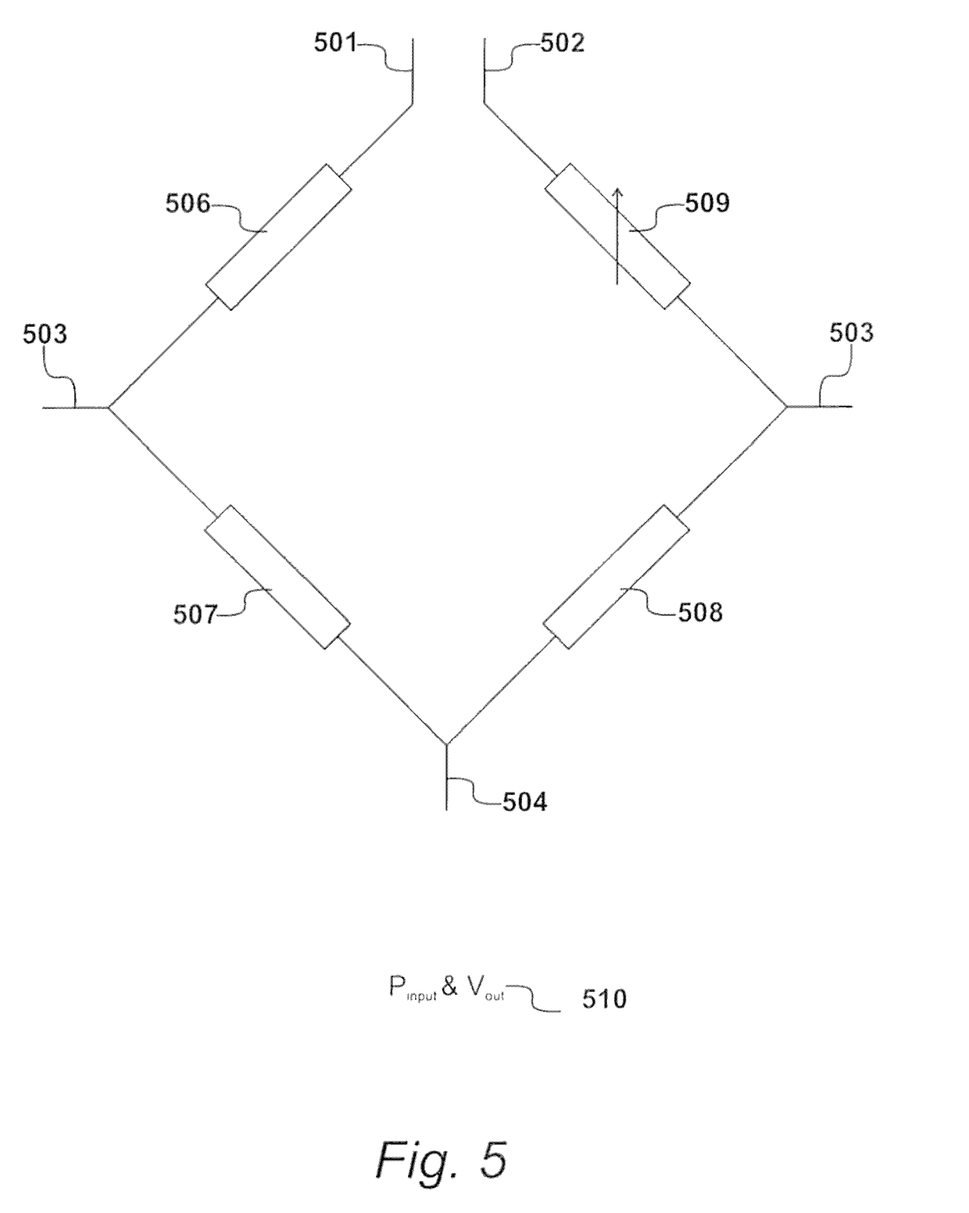
FIG. 5 shows a schematic representation of a bridge configuration of a pressure sensing layer in accordance with the invention.

FIG. 5

A schematic representation of a bridge configuration forming part of pressure sensing layer 304 is shown in FIG. 5.

The pressure sensing element is formed by a sputtering process to form a bridge composed of four resistors on the surface of a stainless steel flat diaphragm such as support plate 307.

In the embodiment, the bridge presents five external terminals, identified as terminals 501, 502, 503, 504 and 505. The bridge further comprises resistors 506, 507 and 508 and variable resistor 509. When a pressure is applied, the pressure acts on the flat diaphragm to cause elastic deformation. Consequently, the strain resistance changes which forces the bridge out of balance, and the output voltage of the bridge is proportional to the pressure input as indicated at 510.

In this way, the pressure signal is converted into an electrical signal and output, so that processor 401 is able to control vibration device 305 to vibrate according to the received electrical signal.

Figure 6:
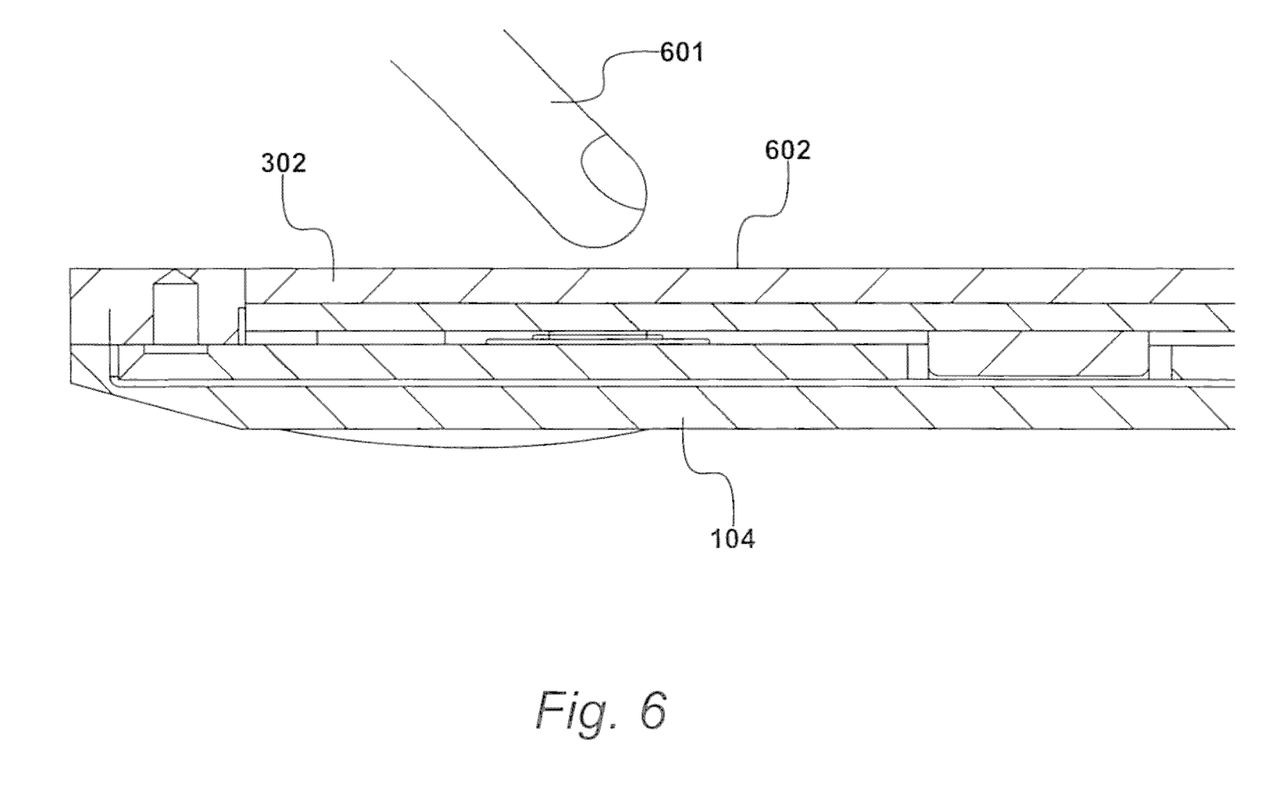
FIG. 6 shows a schematic representation of a touch pad of the present invention under the application of an applied force.

FIG. 6

A schematic representation of a touch pad of the present invention under an application under an applied force or pressure from a finger press of a user is shown in FIG. 6.

In the embodiment, touch pad 104 is shown in schematic cross-sectional view and a user's finger 601 is shown in proximity to touch pad 104. In use, finger 601 moves along surface 602 of touch pad 104 depending on the user's requirements.

When the user slides their finger 601 on cover 302, the position of finger 601 can be detected and a track of the movement can be displayed on display 102, as noted previously.

As finger 601 moves on cover 302, the position corresponding to capacitive sensing layer 303 senses the change in capacitance, so as to determine the coordinate position of the finger press. At the same time, pressure sensing layer 304 senses a pressure signal when finger 601 slides on the cover 302.

When the processor 401 receives a voltage signal from the capacitive sensing layer 303 or a pressure signal from the pressure sensing layer 304, processor 401 can provide a signal to activate vibration device 305. This ensures that a tactile response is given to finger 601 so that the user is able to feel vibration from vibration device 305.

Figure 7:
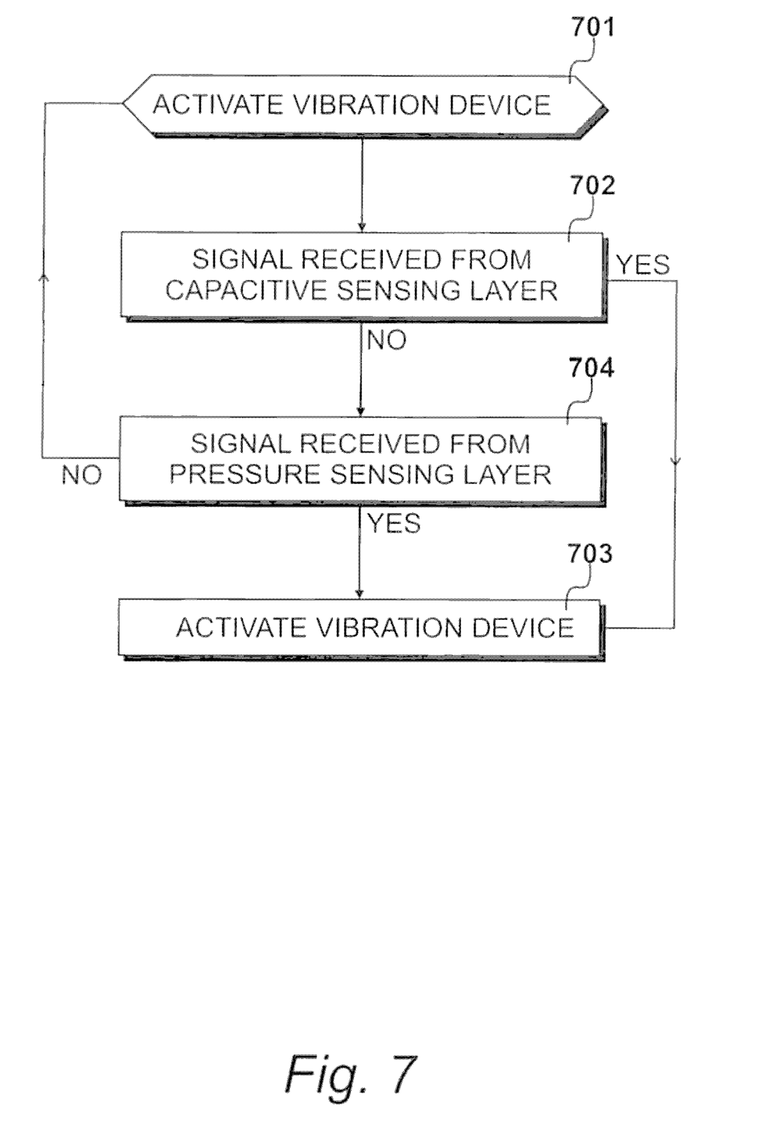
FIG. 7 shows a method of activating a touch pad in accordance with the invention.

FIG. 7

Processor 401 is configured to provide a response following an application of force or pressure by finger 601. Thus, in order to activate touch pad 104, when a user provides an application of force to cover 302 by means of finger 601, the processor follows a process shown schematically in FIG. 7.

When a question is asked at step 701 as to whether the vibration device should provide a response and be activated, processor 401 asks a question as to whether a signal has been received by capacitive sensing layer 303 at step 702. If the question is answered in the affirmative vibration device 305 is activated, as per step 703. If the question is answered in the negative, a further question is asked as to if a signal has been received from pressure sensing layer 304 at step 704. If this question is answered in the affirmative, the vibration device 305 is activated as per step 703, however, if this question is answered in the negative, processor 401 continues to monitor for signals by means of steps 702 and 704 to ensure that the vibration device is activated in response to any finger contact on touch pad 104.

Thus, when a pressure is applied by finger 601, if the processor 401 receives voltage signal from the capacitive sensing layer or a pressure signal from the pressure sensing layer, it activates the vibration feedback from the vibration device 305 so that finger 601 receives a response of vibration.

Thus, the present invention combines the capacitive sensing layer and the pressure sensing layer to add an extra feature of providing a vibration output to ensure the user's experience is more tactile.

The invention claimed is:

1. A touch pad, comprising:
   a housing comprising a vibration device;
   a cover;
   a capacitive sensing layer electrically connected to a processor;
   a pressure sensing layer arranged in said housing, said pressure sensing layer being electrically connected to said processor, wherein:
      said capacitive sensing layer is positioned between said cover and said pressure sensing layer, and
      said processor is configured to utilize a voltage signal output from either said capacitive sensing layer or said pressure sensing layer to activate said vibration device; and
   an actuator provided between said capacitive sensing layer and said pressure sensing layer, a cross-sectional area of said actuator being smaller than a cross-sectional area of said pressure sensing layer, and said actuator being configured to transfer an applied pressure through said capacitive sensing layer to said pressure sensing layer to amplify said applied pressure on said actuator such that said pressure sensing layer receives an indication of the pressure applied, wherein:
   when said capacitive sensing layer is in a low current state and a voltage signal output from said capacitive sensing layer cannot be processed by said processor, said processor utilizes a voltage signal output from said pressure sensing layer to activate said vibration device.

2. The touch pad of claim 1, wherein said pressure sensing layer comprises a thin film pressure sensor.

3. The touch pad of claim 1, further comprising a support plate.

4. The touch pad of claim 3, wherein said pressure sensing layer is positioned on an upper surface of said support plate.

5. The touch pad of claim 3, wherein said vibration device is attached to said support plate.

6. The touch pad of claim 3, wherein said support plate comprises a metallic material.

7. The touch pad of claim 3, wherein said support plate is secured to said housing.

8. The touch pad of claim 1, wherein said vibration device is a linear motor.

9. The touch pad of claim 8, wherein said cover comprises a metal material.

10. The touch pad of claim 9, wherein said vibration device is disposed to one side of said capacitive sensing layer away from said cover.

11. The touch pad of claim 1, wherein said cover and said capacitive sensing layer have a substantially similar cross-sectional area.

12. A keyboard comprising the touch pad of claim 1.

13. An electronic device comprising the keyboard of claim 12.

14. A method of activating a touch pad, comprising the steps of:
   providing an application of force to a cover of a touch pad, said touch pad comprising a capacitive sensing layer and a pressure sensing layer electrically connected to a processor, and an actuator provided between said capacitive sensing layer and said pressure sensing layer, a cross-sectional area of said actuator being smaller than a cross-sectional area of said pressure sensing layer; and transferring said application of force through said capacitive sensing layer to said pressure sensing layer by means of said actuator to amplify applied pressure on said actuator such that said pressure sensing layer receives an indication of the pressure applied;

said processor being configured to:
  determine a voltage signal output from either one of said capacitive sensing layer or said pressure sensing layer;
  activate a vibration device of said touch pad in response to said determined voltage signal; and
  utilize a voltage signal output from said pressure sensing layer to activate said vibration device when said capacitive sensing layer is in a low current state and a voltage signal output from said capacitive sensing layer cannot be processed by said processor.

* * * * *